United States Patent [19]

Baranetz et al.

[11] Patent Number: 5,485,309
[45] Date of Patent: Jan. 16, 1996

[54] COMPACT DISPLAY FOR ANIMATING POLARIZED IMAGES

[76] Inventors: Oleg N. Baranetz; Leonid Lysy, both of 455 Huntington Ave., Buffalo, N.Y. 14214

[21] Appl. No.: 195,207

[22] Filed: Feb. 14, 1994

Related U.S. Application Data

[63] Continuation-in-part of Ser. No. 43,036, Apr. 5, 1993, abandoned.

[51] Int. Cl.[6] .......................... G02B 5/30; G02B 27/28
[52] U.S. Cl. .................. 359/485; 359/489; 359/857
[58] Field of Search .......................... 359/498, 495, 359/500, 501, 857, 858, 859, 860, 861, 862, 485, 489

[56] References Cited

U.S. PATENT DOCUMENTS

| | | | |
|---|---|---|---|
| 1,698,905 | 1/1929 | Beechlyn | 359/857 |
| 2,018,214 | 10/1935 | Land | 362/19 |
| 2,122,225 | 6/1938 | Wheelwright | |
| 2,146,962 | 2/1939 | Land | 362/19 |
| 2,165,974 | 7/1939 | Land | 362/19 |
| 2,200,959 | 5/1940 | Land | 362/19 |
| 2,473,857 | 6/1949 | Burchell | 40/548 |
| 2,540,417 | 2/1951 | Bergmans et al. | 359/858 |
| 2,700,919 | 2/1955 | Boone | |
| 2,748,659 | 6/1956 | Geffcken et al. | 359/495 |
| 2,821,114 | 1/1958 | Wiemer et al. | 359/495 |
| 2,869,423 | 1/1959 | Hoge et al. | 359/858 |
| 2,882,631 | 4/1959 | Boone | |
| 2,900,884 | 8/1959 | Coleman | 359/858 |
| 2,977,845 | 4/1961 | Boone | 40/548 |
| 3,054,204 | 9/1962 | Yates | 40/548 |
| 3,315,391 | 4/1967 | Lane et al. | 40/548 |
| 3,319,519 | 5/1967 | Shelanski | 362/19 |
| 3,437,401 | 4/1969 | Siksai | 359/501 |
| 3,538,322 | 11/1970 | Arsem | |
| 3,601,469 | 8/1971 | Siksai | 359/501 |
| 3,676,845 | 7/1972 | Siksai | 359/501 |
| 3,767,288 | 10/1973 | Gross | 359/498 |
| 3,804,522 | 4/1974 | Smith | 359/501 |
| 3,807,072 | 4/1974 | Luxon, Jr. | 359/501 |
| 4,135,787 | 1/1979 | McLafferty | 359/858 |
| 4,475,027 | 10/1984 | Pressley | 359/858 |
| 4,484,334 | 11/1984 | Pressley | 359/858 |
| 4,629,288 | 12/1986 | Wagers | 359/857 |
| 5,206,763 | 4/1993 | Macken et al. | 359/861 |

Primary Examiner—Martin Lerner
Attorney, Agent, or Firm—Crossetta & Associates

[57] ABSTRACT

A display device for creating animating images comprises a source of polarized light and first and second riffled reflecting means comprising a plurality of reflecting surfaces, placed in the path of light from said source of polarized light and arranged to reflect polarized light so as to transform the polarized light beam to a larger cross-section and through a polarizing screen to a diffusing surface.

19 Claims, 5 Drawing Sheets

COMPACT DISPLAY FOR ANIMATING POLARIZED IMAGES

This invention relates to display devices, particularly to compact display devices which utilize polarized light to display animated images. This is a continuation-in-part of U.S. Ser. No. 08/043,036 filed Apr. 5, 1993 now abandoned.

BACKGROUND OF THE INVENTION

Display devices, utilizing polarized light to create and display animation are generally known and have been used to form animated images on bill-boards, display signs, store windows and the like. Generally, such devices create an image by directing polarized light in a path from a polarized light source to an image screen which contains material having different dirrections of polarization and/or a patterned light intercepting plastic sheet with polarized layer or the like, arranged to selectively pass light therethrough and form an intended image on the screen. The screen, generally comprises transparent or diffusing surfaces and typical prior art polarizing arrangements utilized for forming images are generally disclosed in U.S. Pat. Nos. 2,700,919; 2,977,845; 3,054,204; 3,437,401 and 3,538,322.

Prior art devices utilizing such typical polarizing imaging means have major disadvantages, particularly in achieving uniform illumination of the viewing screen. Generally, such devices require significant spacing between the light source and the screen, or incorporation of high density diffusors between the light source and the screen to enable uniform illumination of a screen area of significant dimension. The large space requirement and/or use of high density diffusers, generally requires significant increases in light source brightness of the system which generally results in higher energy consumption and heat generation problems which in turn generally require elaborate provision for the dissipation of heat at the light source.

U.S. Pat. No. 3,676,845 to Siksai discloses an interesting automotive turn signal indicating system wherein a generally cylindrical beam of polarized light is directed to an elongated rectilinear mirror, arranged within the beam of polarized light at an angle to the axis of the polarized light beam. The mirror has a plurality of parallel light reflecting ridges arranged generally perpendicular to the axis of the polarized light beam and polarized light, which engages the elongated rectilinear mirror, is reflected by the parallel ridges of the mirror to illuminate a viewing screen having the general rectilinear shape of the mirror. A rotating polarizing screen, in the path of the light source, provides polarized light incrementally along the length of the elongated mirror which is reflected to the viewing screen and forms an image of an arrow moving across the screen in the direction of intended turning.

An object of the present invention is to provide a animated polarized light display device that is a compact arrangement and can provide uniform illumination to an enlarged viewing screen.

Another object of the present invention is to provide an animated polarized light display device which can furnish a uniformly bright image, to an enlarged viewing screen, with a light source of modest intensity.

A still further object of the invention is to provide a compact arrangement for transforming a polarized light beam to a enlarged cross-sectional size, while maintaining generally uniform and bright viewing screen illumination.

These and other objects of the invention will become apparent from the following description of the embodiments.

SUMMARY OF THE INVENTION

The present invention is to a polarized light imaging device comprising a combination of elements aligned in a compact arrangement for creating enlarged animated display images. The elements of the device generally comprise a source of polarized light, means for transforming a polarized light beam emanating from said source to a larger cross-sectional size, a light polarizing image screen and a diffusing screen.

The source of polarized light generally comprises a light source and a means for polarizing light emitting from the light source. The light source can be any convenient light emitting means operable in the invention but preferable comprises an incandescent lamp, neon or fluorescent tube or the like. The most preferred light emitting source is an arrangement wherein light rays emitted from a source are reflected, directed or otherwise gathered along a defined path to the polarizing means. Preferred light sources include incandescent spotlight sources, laser light sources and the like. Sources where light rays are directed in generally parallel paths to the polarizing means are generally preferred.

The means for polarizing light from the light source can be any convenient means operable herewith, such as a polarizing screen, rotatable or otherwise, and includes a lenticular polarizing lens and the like which are arranged in a beam of light emanating from the light source. The means for polarizing light can polarize light in a variety of directions of polarization, however, it is preferred that the polarization be uni-directional. It is also preferred that the source of polarized light comprise means wherein the direction of vibration of the polarized light can change, such as through a rotating polarizing screen comprising polarizing elements having various diverse axes of polarization, liquid crystal means and the like. One particularly interesting polarized light source comprises a neon tube, surrounded by a transparent polarizing screen as disclosed in U.S. Pat. No. 3,538,322, to form the polarized light source.

The means for transforming a polarized light beam generally comprises a unique arrangement of first and second riffled reflecting means arranged in the path of the polarized light beam. Each riffled reflecting means comprises a plurality of polarized light reflecting surfaces which are incrementally arranged along and progressively through a path of the polarized light beam, so as to intersect discrete polarized light rays comprising the polarized light beam and reflect such along generally substantially parallel paths in a different direction. By discrete polarized light rays is meant one or more polarized light rays comprised within a portion of the cross-section of the polarized light beam.

The first riffled reflecting means preferably comprises an elongate structure having a plurality of effective reflecting surfaces, arranged incrementally along the path of the polarized beam emanating from the polarized light source so as to intersect the discrete polarized light rays which comprise the cross-section of the polarized beam, incrementally along and progressively through a cross-section of the beam. The reflecting surfaces are arranged so that the polarized light rays which are reflected therefrom form a reflected beam of generally substantially parallel, polarized rays, characterized in that the beam has a cross-section which has a major elongate diameter dimensioned to generally correspond to the linear distance between the first and last effective incremental polarized light ray intersecting surface within the path of the beam. Such linear distance between the first and last effective incremental intersecting surface is generally dimensioned to correspond to a dimension of the image viewing screen which is intended to be illuminated.

The second riffled reflecting means also comprises a plurality of effective reflecting surfaces, however, such are arranged incrementally along the path of the polarized beam reflected from the first riffled reflecting means.

The arrangement of effective reflecting surfaces comprising the second riffled reflecting means is generally dimensioned to correspond to an area of the image screen to be illuminated and is arranged within the path of the cross-sectionally elongated beam of reflected polarized light rays from the first riffled reflecting means. The plurality of effective reflecting surfaces of the second reflecting means are arranged to incrementally intersect polarized light rays along the path of the elongate beam progressing in a direction through a cross-sectional diameter of the reflected elongated beam which is at an angle to the major elongate diameter of the reflected beam and preferably perpendicular thereto. The reflecting surfaces are arranged so that the reflected polarized light rays form a beam of generally substantially parallel polarized rays, characterized by a cross-section having a dimension generally corresponding to the linear distance between the first and last effective incremental polarized light ray intersecting surfaces of the first riffled reflecting means and another dimension which generally corresponds to the linear distance between first and last effective incremental polarized light intersecting surfaces of the second riffled reflecting means. Thus, the polarized light beam reflected from the second riffled reflecting means has been transformed into a beam which can be sized as desired, allowing optimal compaction of the display unit.

In the process of the invention, a polarized light beam is generated by a polarized light source, the beam is transformed by a first riffled reflecting means which reflects polarized light rays at increments along the path and through a cross-section of the beam so as to create a reflected polarized light beam having a cross-section which has been elongated in a first direction, the reflected beam is then transformed by a second riffled reflecting means which reflects polarized light rays at increments along the path and through a cross-section of the beam so as to create a reflected polarized light beam having a cross-section which has been elongated in a second direction, and the so reflected beam is directed through an image screen containing polarizing elements to form an image.

The degree of transformation of the polarized light beam depends upon the length of the incremental progressive arrangement of reflecting surfaces along the beam. Thus, a generally round beam of polarized light having a cross-sectional diameter of two inches will be transformed to a cross-sectional diameter of 10 inches, if the incremental progressive arrangement of effective reflecting surfaces of the first and second riffled reflecting means is 10 inches. If the incremental progressive arrangement of effective reflecting surfaces of the first riffled reflecting means is 10 inches and the second is 5 inches, the beam will be widened to an oblong cross-section having a 10 inch major and a five inch minor diameter. A polarized beam that is round or oblong may be made rectangular, square of the like depending upon the arrangement of the effective reflecting surfaces and conversely, a square, rectangular or the like beam may be made oblong or round.

Polarized light directed to the image screen may come from one or more arrangements of the invention, and/or may be a combination including polarized light rays from arrangements of the prior art. For example, polarized light directed to the image screen may be composed from two or more separate arrangements of the invention which separately reflect polarized light to various distinct or overlapping areas of the image screen. Two or more separate first riffled reflecting means may reflect separate polarized light beams to a common second riffled reflecting means for reflection to the image screen. Still further, an image screen may receive polarized light from a second riffled reflecting means and also receive polarized light from a polarizing light source or the like of the prior art. Thus, various combinations and permutations of the invention with or without means of the prior art, are considered as within the invention.

The reflecting surfaces of the riffled reflecting means are generally arranged along a base plane in such manner as to reflect polarized light at an angle to the path. The plurality of reflecting surfaces may be joined or otherwise engaged or can be discretely arranged. The reflecting surfaces can be arranged at the same or at different angles from a base plane and may be convex, concave or otherwise configured to reflect polarized light from the path from which it engages the reflecting surface, to the other riffled reflecting means or through the image screen. In a preferred embodiment, the surfaces are arranged in adjacent planes angled from a base plane and engaged to form a cohesive unit.

Polarized light rays are reflected by the first and second riffled reflecting means in generally parallel paths. The polarizing screen comprises light polarizing means such that polarized light rays in the polarized light path are blocked by polarizing materials having congruent polarizing axis. The polarizing means forms an image or a patterned plastic sheet can contribute as disclosed in U.S. Pat. No. 3,437,401.

The polarized light may follow a direct or indirect path from the polarized light source to either or both riffled reflecting means. Generally it is preferred that light from the polarized light source travel in a generally straight line to the riffled reflecting means however, it is contemplated as within the invention that such light be reflected by a mirrored surface or the like to the riffled reflecting means.

The diffusing means can be any convenient arrangement operable in the invention. Generally the diffusing means comprises a random diffuser such as mat glass, plastic or the like but, it can also comprise a system of lenses which diffuse light in predetermined directions.

In one embodiment of the invention, a riffled reflecting means comprises an assembly of a plurality of reflecting surfaces angularly mounted along a base plane and a polarized light beam crosses the base plane of the assembly in its path to the reflecting surfaces. Such arrangement is generally referred to as a rear illumination arrangement. In another such embodiment a polarized light beam is reflected by the reflecting surfaces of a riffled reflecting means without generally intersecting the base plane.

The nature and mode of operation of the present invention will now be more fully described in the following description taken with the accompanying drawings.

DETAILED DESCRIPTION OF THE INVENTION

Figure 1:
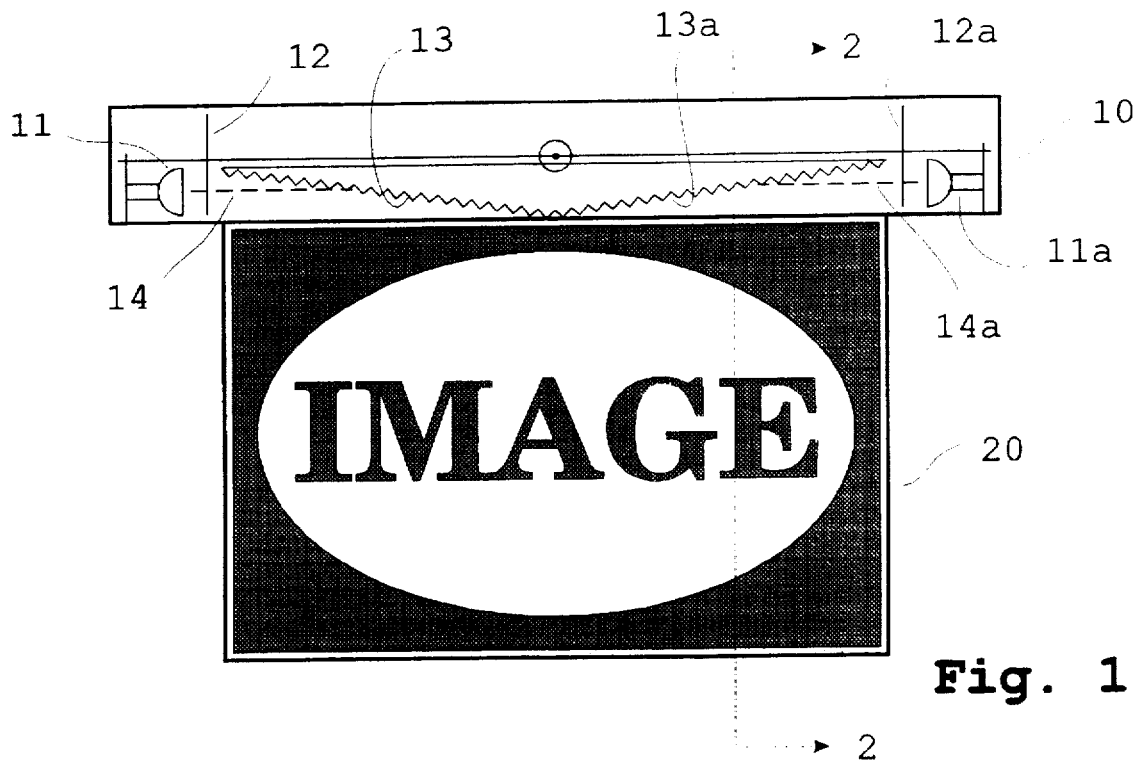
FIG. 1 is a front elevational, partial sectional view illustrating a compact, polarized light display arrangement of the invention.
Figure 2:
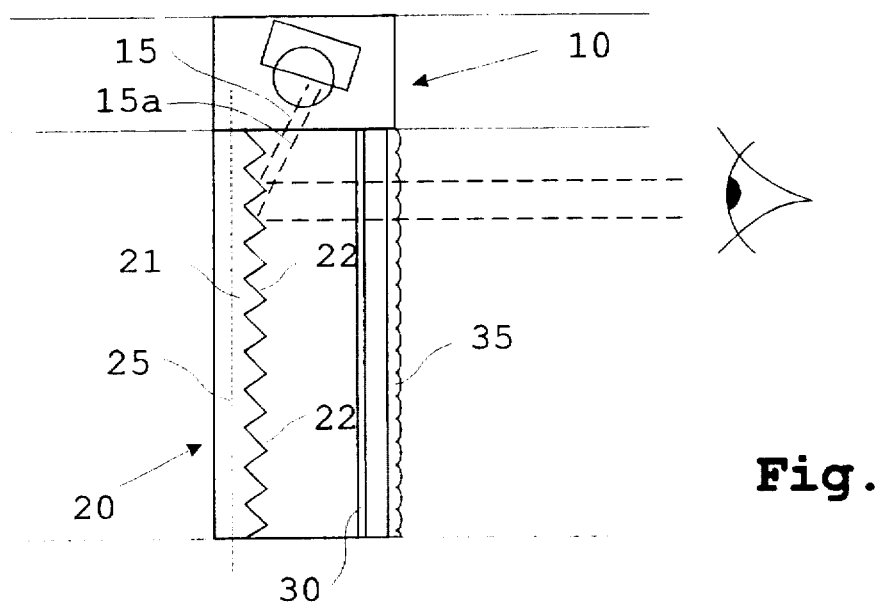
FIG. 2 is a side sectional view of the compact polarized light display arrangement of FIG. 1.

Referring now to FIGS. 1 and 2 wherein a compact polarized image display embodiment of the invention is illustrated having an upper polarizing light source assembly 10 and a lower imaging assembly 20. In this embodiment, the upper light source assembly comprises two riffled reflecting means which reflect polarized light from two separate polarized light sources. Thus, polarized light sources comprising incandescent lamps 11 and 11a respectively and polarizing screens 12 and 12a respectively emit polarized light beams to first riffled reflecting mirrors 13 and 13a respectively. Polarized light beam from the polarized light sources travels generally along paths 14 and 14a respectively to first riffled reflecting assemblies 13 and 13a wherein it is reflected downwardly as cross-sectionally elongated beams 15 and 15a to second riffled reflecting assembly 21 of lower image assembly 20. Riffled reflecting assembly 21 comprises a plurality of reflecting surfaces 22 which are arranged at an angle from base plane 25 of the assembly and reflect polarized light from paths 15, 15a to the image screen. The image screen is illustrated as comprising polarizing screen 30 which comprises a multiplicity of polarizing elements having polarizing axes arranged in different directions, such that polarized light rays in the path are blocked by polarizing elements having congruent polarizing axes, and diffusing screen 35 on which the image is displayed.

Figure 3:
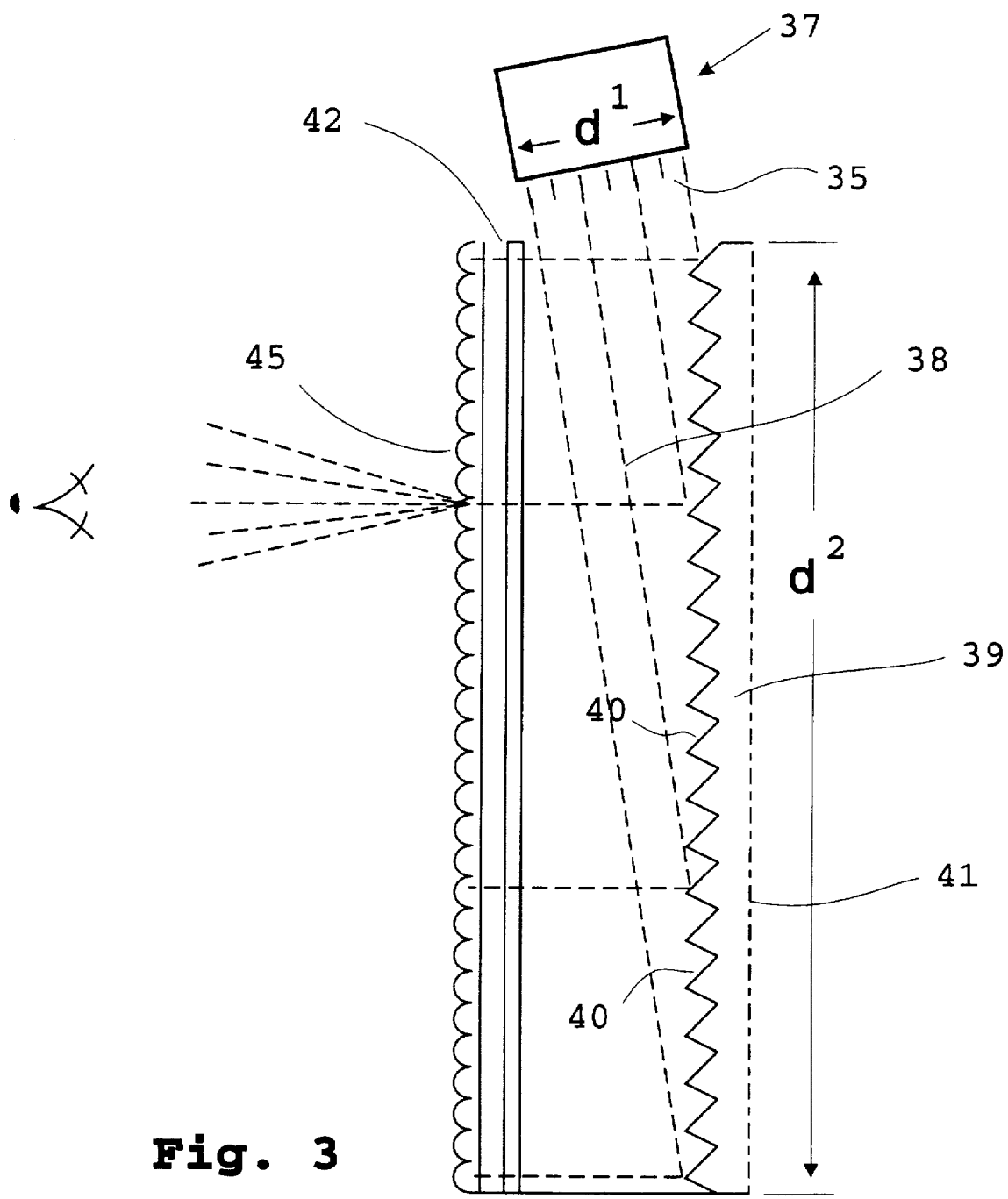
FIG. 3 is a diagrammatic illustration of the reflection of polarized light rays from a second riffled reflector to the image screen in accord with the process of the invention.

FIG. 3 diagrammatically illustrates the reflection of polarized light rays, which have been received from the first riffled reflecting means, by the second riffled reflector to the image screen in accord with the process of the invention. Therein, polarized light rays 35 from first riffled reflecting assembly 37 travels along path 38 to second riffle reflecting assembly 39. A linear dimension of the polarized light beam illustrated as being $d^1$ as it reflects from first riffled reflecting assembly 37, is transformed to larger linear dimension $d^2$ depending upon the linear dimension of second riffled reflecting assembly 39 which is angularly placed in the path of the beam. In the embodiment, second riffled reflecting assembly 39 comprises a system of a mirrored planes 40 placed one after other in the path of light. The angles of mirrored planes 40 relative to base plane 41 are arranged to reflect polarized light to screen 42. Screen 42 comprises a light polarizing means having polarizing material arranged to form an image, or polarpicture, by the polarized light passing through the screen to diffuser 45 which creates an image thereon which is visible from various directions of view.

Figure 4:
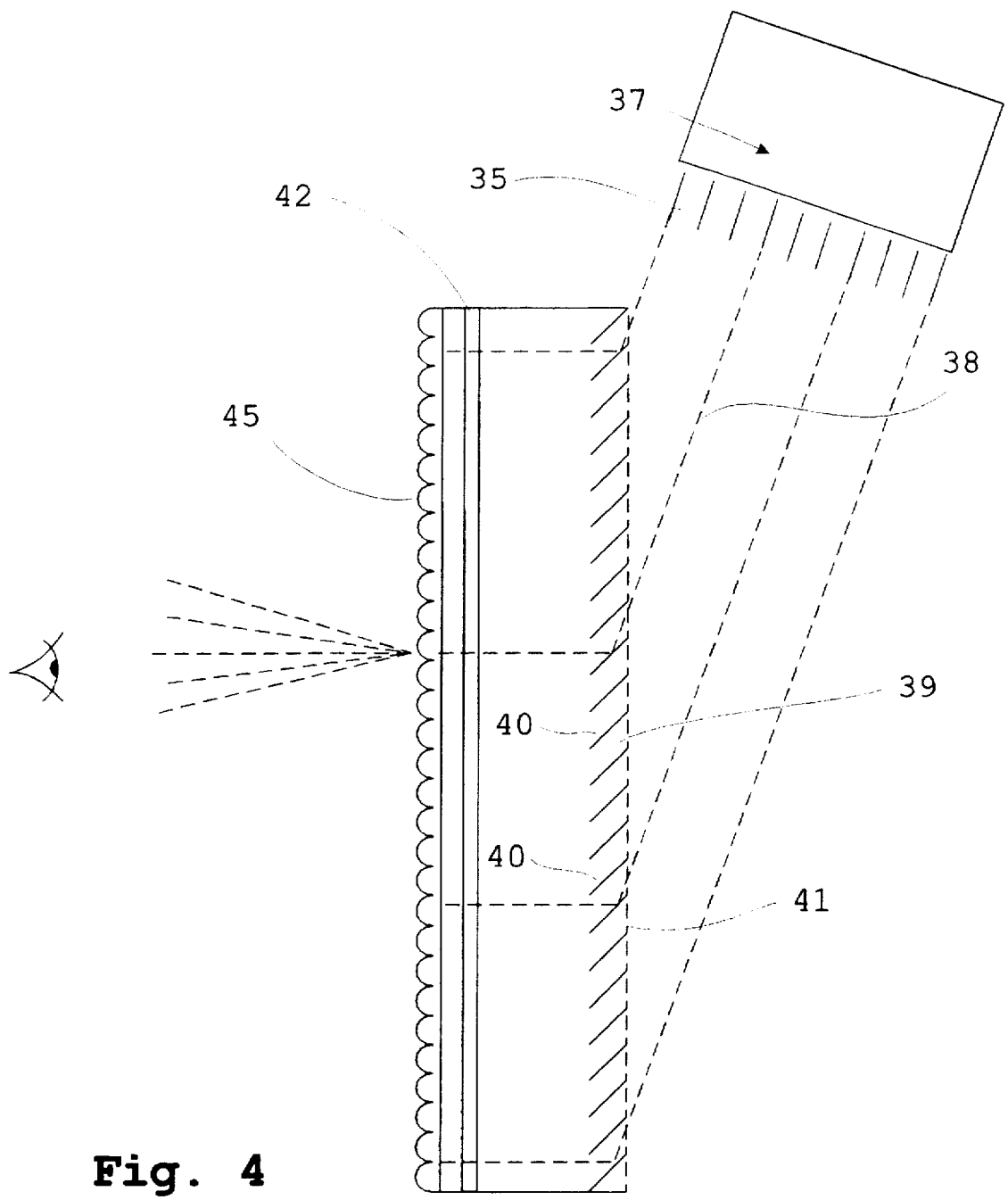
FIG. 4 is a diagrammatic illustration of another embodiment of the reflection of polarized light rays from a second riffled reflector to the image screen in accord with the process of the invention.

FIG. 4 provides an embodiment wherein polarized light rays reflected from the first riffled reflecting assembly passes through base plane 41 of second riffled reflecting assembly 39, representing a rear illumination embodiment. In this embodiment the riffled reflecting assembly 39 must have transparent areas to allow the light to the reflecting surfaces. A rear illumination arrangement is most desirable when one wants to widely separate the source of polarized light from the image assembly, for example when the image assembly is placed in a window or the like and the first riffled reflecting assembly is at an adjacent location such as the ceiling.

Figure 5:
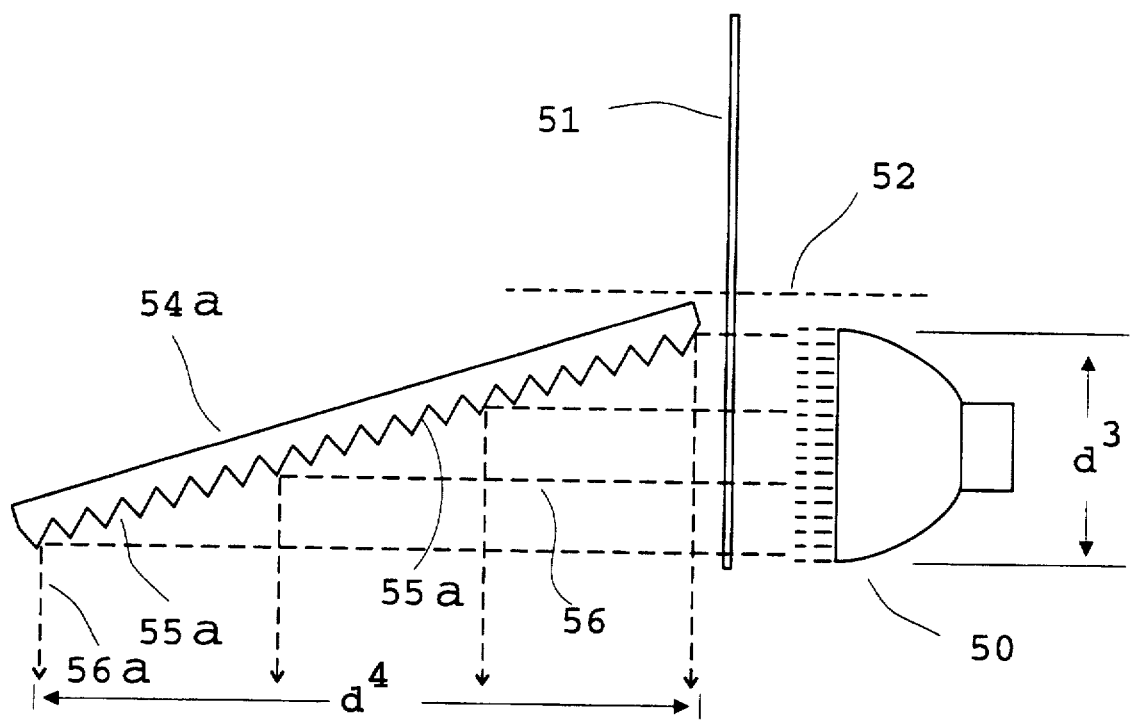
FIG. 5 is a diagrammatic illustration of polarized light rays from a polarized light source which are reflected from a first riffled reflector in accord with the invention.

FIGS. 5 diagrammatically illustrates the reflection of polarized light rays from a polarized light source by a first riffled reflector assembly. Therein, a cylindrical beam of polarized light rays 56, having a diameter $d^3$ is generated through the coaction of incandescent light source 50 with polarizing screen 51 rotating about axis 52 and directed to first riffled reflector assembly 54a which comprises an elongate structure having a plurality of effective reflecting surfaces 55a, arranged incrementally along the path of the polarized beam emanating from the polarized light source so as to intersect the discrete polarized light rays which comprise the cross-section of the polarized beam, incrementally along and progressively through a cross-section of the beam. The arrangement of reflecting surfaces reflects the beam of polarized light rays in a generally substantially parallel array 56a to the second riffled reflecting assembly which is not shown. The reflected array is characterized in that the beam has a cross-section which has a major elongate diameter $d^4$ dimensioned to generally correspond to the linear distance between the first and last effective incremental polarized light ray intersecting surface within the path of the beam and a minor diameter corresponding to the smallest of the diameter of the beam or the distance between the first and last effective incremental intersecting surface across the width of the first reflecting assembly.

Figure 6:
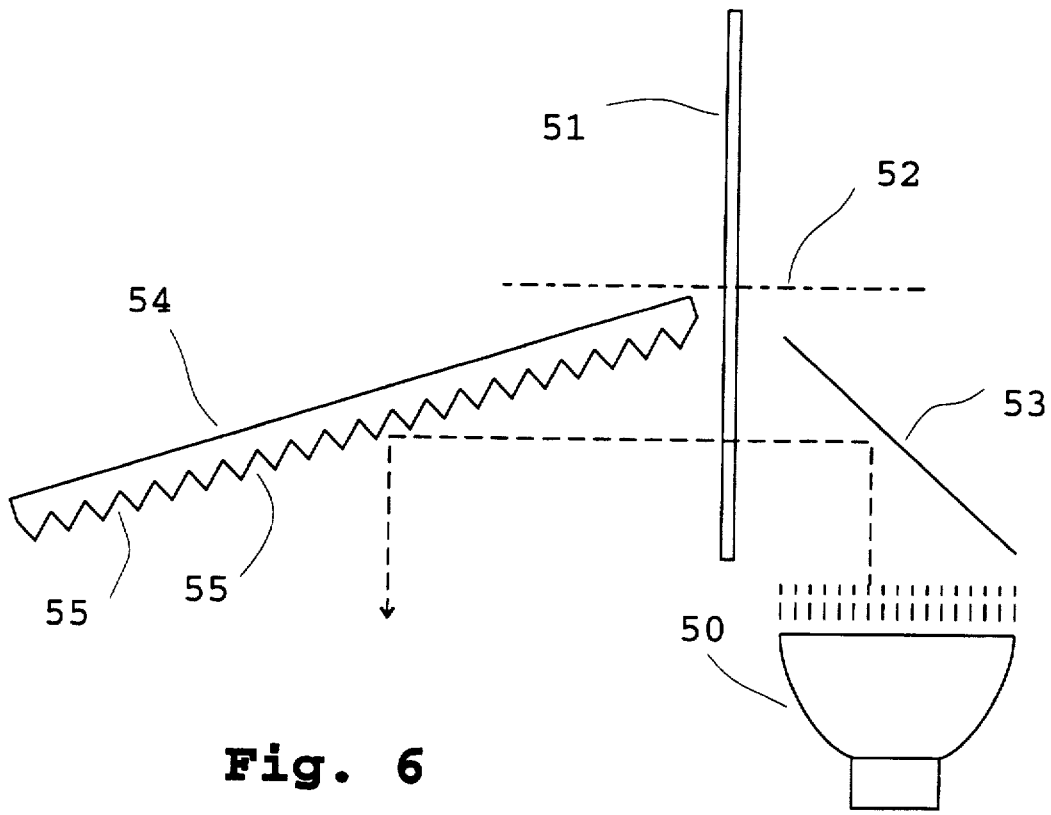
FIG. 6 is a diagrammatic illustration of another embodiment of polarized light rays from a polarized light source which are reflected from a first riffled reflector in accord with the invention.
Figure 7:
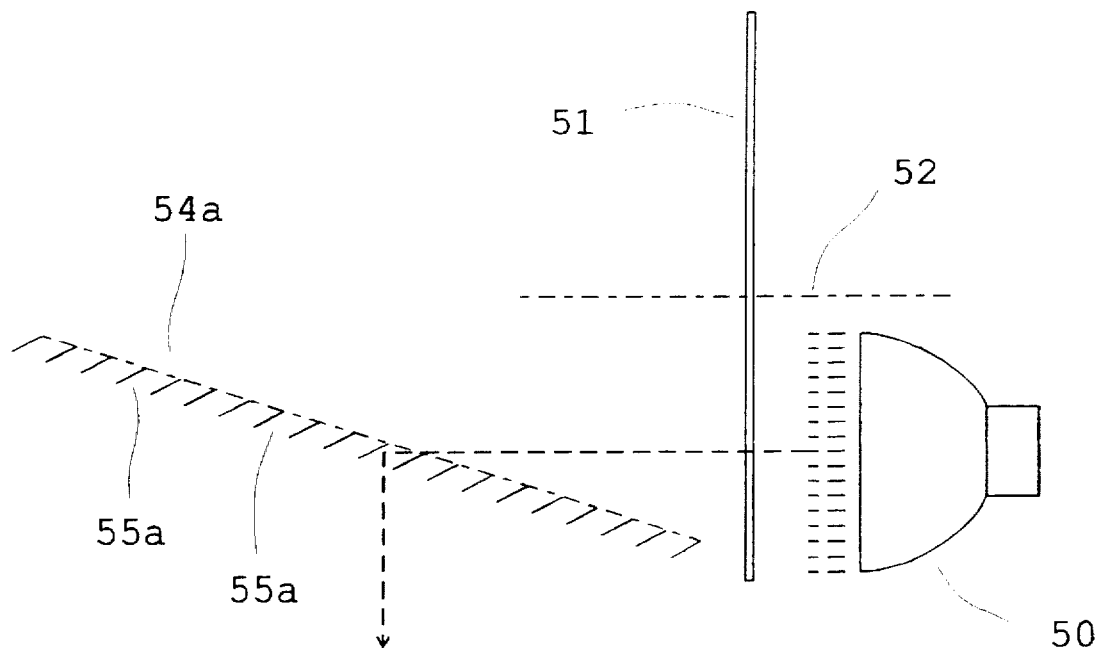
FIG. 7 is a diagrammatic illustration of another embodiment of a first riffled reflector wherein polarized light rays from a polarized light source are reflected.
Figure 8:
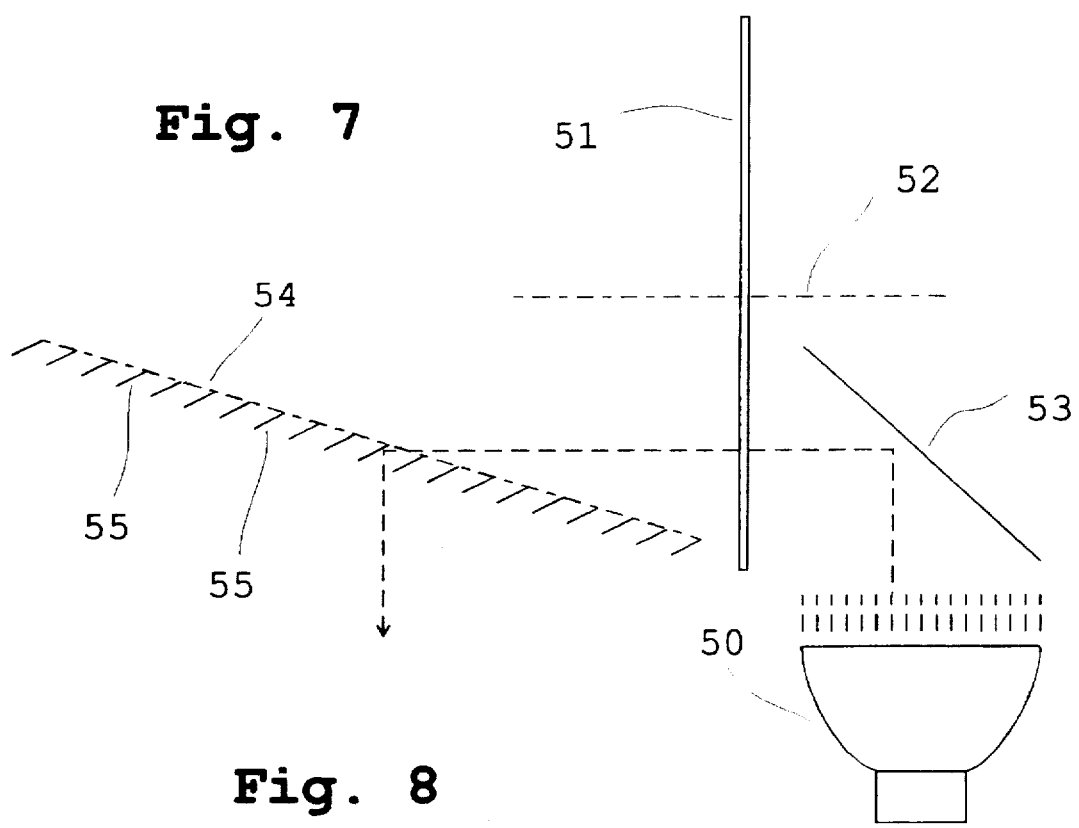
FIG. 8 is a diagrammatic illustration of still another embodiment of a first riffled reflector wherein polarized light rays from a polarized light source are reflected.

FIGS. 6–8 illustrate other embodiments of the invention comprising a linear source of polarized light arranged with a moving polarizing screen. In each of the FIGS 6–8, light from a light emitting source 50 is directed through polarizing filter 51 which rotates about axis 52 and polarizes light which passes therethrough. In FIGS. 6 and 8, light is directed to reflecting mirror 53 through polarizing screen 51 to surfaces 55 of first riffled reflecting assembly 54. In FIG. 7, light is directed to polarizing screen 51 and then directly to riffled reflecting surfaces 55a of first riffled reflecting assembly 54a. The first riffled reflecting surfaces act as a first dimensional transformer of the light beam, redirecting it to the second riffled reflecting assembly which acts as a second dimensional transformer and then to the polarpicture of the polarized screen. Thus, a narrow light beam from a spotlight is transformed into a wide beam.

The above described means of altering polarized light is most suitable for creation of a compact display device. It has particular utility in providing balanced illumination with minimal heat problems occasioned by the placement of lamps outside of the body of the display.

The sources of polarized light as illustrated in the figures can comprise any quantity and any combination of light emitting elements. Generally, when more than one element is used, the rotation of the polarizing filters must be synchronized, and may include rotating opposing polarizing filters in opposite directions at the same or different speeds.

It should be understood that multiple first riffled reflecting means can interract with a single second riffled reflecting means and the second riffled reflector may have reflecting surfaces arranged in various directions for receipt of reflected polarized light from first riffled reflecting means mounted from various directions. Moreover, polarizing filters can contain more than one direction of polarization and/or may be colored. The light-polarizing areas of the polarizing screen can be multicolored and may even comprise a colored design. To provide color effects, birefringent material can be placed between reflecting mirrors and the polarizing screen. To create polarized light with more complicated polarization we can use two or more serially placed polarizing filters which can rotate at the same or different speeds.

We claim:

1. A polarized light imaging device comprising the combination of a source of polarized light, first and second riffled reflecting means, light polarizing image screen and a diffusing screen;

wherein said source of polarized light is arranged to emit a beam of polarized light comprising a pattern of polarized rays along a first path to said first riffled reflecting means;

said first riffled reflecting means comprising a plurality of light reflecting surfaces, arranged along said first path of said beam of polarized light emitted from said polarized light source so as to intersect said pattern of polarized light rays incrementally along and progressively through a cross-section of said beam of polarized light, and reflect said intersected polarized light rays in a beam along a second path, at an angle to said first path, to said second riffled reflecting means;

said second riffled reflecting means comprising a plurality of light reflecting surfaces, arranged along said second path of said beam of polarized light reflected from the first riffled reflecting means, so as to intersect said pattern of polarized light rays incrementally along and progressively through a cross-section of said beam and reflect said polarized light rays at an angle to the direction of said second path, along a different path to said light polarizing image screen;

said light polarizing image screen and diffusing screen being arranged in said different path of polarized light reflected from said second riffled reflecting means and said light polarizing image screen containing light polarizing material arranged in coordination with said pattern of polarized rays.

2. The combination of claim 1 wherein said source of polarized light comprises means for changing the direction of vibration of the polarized light.

3. The combination of claim 2 wherein said means for changing the direction of polarized light comprises a rotatable polarizing screen.

4. The combination of claim 1 wherein a riffled reflecting means comprises a plurality of joined light reflecting surfaces.

5. The combination of claim 4 wherein a riffled reflecting means comprises a system of mirrored planes placed one after the other in a path of polarized light.

6. The combination of claim 1 wherein a plurality of reflecting surfaces of a riffled reflecting means are arranged in adjacent planes angled from a base plane.

7. The combination of claim 6 wherein said reflecting surfaces are arranged such that polarized light intersects said base plane before engaging said reflecting surfaces.

8. The combination of claim 6 wherein said reflecting surfaces are arranged such that polarized light is reflected by said surfaces before intersecting said base plane.

9. The combination of claim 1 wherein said progression through said cross-section of said second riffled reflecting means is at about a right angle to said progression through said cross-section of said first riffled reflecting means.

10. The combination of claim 1 wherein polarized light from said polarized light source is reflected to said first riffled reflecting means.

11. The combination of claim 10 wherein said light is reflected by a mirrored surface.

12. The combination of claim 1 wherein said diffusing means comprises a system of lenses which diffuse light in predetermined directions.

13. The combination of claim 1 wherein said source of polarized light comprises a light emitting means, a light reflecting surface and a polarizing screen arranged such that light from said light emitting means is reflected by said reflecting surface through said polarizing screen.

14. The combination of claim 1 wherein the image screen comprises patterned light intersecting material for forming an image.

15. The combination comprising means for providing a beam of polarized light having a pattern of polarized light rays and first and second riffled reflecting means arranged within said beam of polarized light to transform said beam of polarized light from a smaller to a larger cross-sectional area;

said first riffled reflecting means comprising a plurality of light reflecting surfaces, arranged to intersect said pattern of polarized light rays incrementally along and progressively through a cross-section of said pattern of polarized light rays and reflect intersected polarized light rays in a first reflected beam comprising generally parallel polarized rays, having a perpendicular cross-section comprising a first increased dimension from a perpendicular cross-section of said beam, to said second riffled reflecting means;

said second riffled reflecting means comprising a plurality of light reflecting surfaces, arranged along the path of said first reflected beam so as to intersect polarized light rays incrementally along and progressively through a cross-section of said first reflected beam and angled from said first increased dimension to reflect a polarized light beam, comprising generally parallel polarized rays, having a cross section comprising a second increased dimension.

16. The combination of claim 15 comprising a source of polarized light.

17. The combination of claim 16 wherein the direction of polarization of said polarized light varies.

18. The combination of claim 15 comprising a polarized image screen.

19. A method of increasing the cross-sectional area of a polarized light beam comprising a pattern of polarized light rays comprising;

directing a representative beam having a patterned array of polarized light from a polarized light source to a first riffled reflecting means, comprising a plurality of light reflecting surfaces arranged to intersect polarized light rays incrementally along and progressively through a cross-section of said representative beam of polarized light and reflecting intersected polarized light rays in a first reflected beam having a perpendicular cross-section comprising a first increased dimension from a perpendicular cross-section said representative beam;

intersecting said first reflected beam of polarized light having a first increased dimension with a second riffled reflecting means, comprising a plurality of light reflecting surfaces arranged along the path of said first reflected beam so as to intersect polarized light rays incrementally along and progressively through a cross-section of said first reflected beam and angled from said first increased dimension, to reflect a polarized light beam having a cross section comprising a second increased dimension.

\* \* \* \* \*